United States Patent
Petrenko (10) Patent No.: US 6,576,115 B2
(45) Date of Patent: Jun. 10, 2003

(54) REDUCTION OF ICE ADHESION TO LAND SURFACES BY ELECTROLYSIS

(75) Inventor: Victor F. Petrenko, Lebanon, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 68 days.

(21) Appl. No.: 09/971,287

(22) Filed: Oct. 4, 2001

(65) Prior Publication Data

US 2002/0017466 A1 Feb. 14, 2002

Related U.S. Application Data (63) Continuation-in-part of application No. 09/426,685, filed on Oct. 25, 1999, which is a division of application No. 09/094,779, filed on Jun. 15, 1998, now Pat. No. 6,027,075, application No. 09/971,287, and a continuation-in-part of application No. PCT/US00/35529, filed on Dec. 28, 2000, and a continuation-in-part of application No. PCT/US99/25124, filed on Oct. 26, 1999.

(60) Provisional application No. 60/262,775, filed on Jan. 19, 2001, provisional application No. 60/105,782, filed on Oct. 27, 1998, and provisional application No. 60/173,920, filed on Dec. 30, 1999.

(51) Int. Cl.$^7$ ................................................ C02F 1/461

(52) U.S. Cl. ........................ 205/628; 205/630; 205/742; 204/242

(58) Field of Search ................................ 205/628, 630, 205/742; 204/242

(56) References Cited

U.S. PATENT DOCUMENTS 6,027,075 A * 2/2000 Petrenko ................. 244/134 R
6,427,946 B1 * 8/2002 Petrenko ................. 244/134 R

* cited by examiner

*Primary Examiner*—Arun S. Phasge
(74) *Attorney, Agent, or Firm*—Curtis A. Vock; Lathrop & Gage L.C.

(57) ABSTRACT

A first electrode layer and a second electrode layer cover the surface of an object. The electrode layers are separated by a relatively large interelectrode distance, usually not exceeding 10 mm. Conductive ice or liquid water fills the interelectrode space between the electrodes, providing electrical connection of the electrodes. A DC or a low-frequency AC voltage is applied across the electrodes. The applied voltage causes electrolysis of water molecules at the electrodes, resulting in generation of hydrogen and oxygen gas bubbles. Optionally, a DC power supply generates sparks that ignite a mixture of the hydrogen and oxygen gases.

22 Claims, 4 Drawing Sheets

REDUCTION OF ICE ADHESION TO LAND SURFACES BY ELECTROLYSIS

RELATED APPLICATIONS

This application claims the benefit of U.S. provisional application Serial No. 60/262,775, filed Jan. 19, 2001. This application is also a continuation-in-part application of commonly-owned and copending U.S. patent application Ser. No. 09/426,685, filed Oct. 25, 1999, which is a divisional application of U.S. patent application Ser. No. 09/094,779, filed Jun. 15, 1998, issued as U.S. Pat. No. 6,027,075 on Feb. 22, 2000; and this application is also a continuation-in-part application of commonly-owned and copending PCT application PCT/US99/25124, filed Oct. 26, 1999, which claims the benefit of U.S. provisional application Serial No. 60/105,782, filed Oct. 27, 1998, now abandoned; and this application is also a continuation-in-part application of commonly-owned and copending PCT application PCT/US00/35529, filed Dec. 28, 2000, which claims the benefit of U.S. provisional application Serial No. 60/173,920, filed Dec. 30, 1999, now abandoned, each of which is hereby incorporated by reference.

GOVERNMENT LICENSE RIGHTS

The U.S. Government has certain rights in this invention as provided for by the terms of Grant #DAAH 04-95-1-0189, awarded by the Army Research Office, and of Grant No. MSS-9302792, awarded by the National Science Foundation.

FIELD OF THE INVENTION

The invention is related to the field of ice adhesion, specifically, to decreasing the adhesion strength of ice to surfaces of solid objects, in particular, to land-based surfaces in transportation systems.

BACKGROUND OF THE INVENTION

Statement of the Problem

Ice adhesion to certain surfaces causes various types of problems. For example, excessive ice accumulation on aircraft wings endangers the plane and its passengers. Ice on ship hulls creates navigational difficulties, expenditure of additional power to navigate through water and ice, and unsafe conditions. Problems associated with ice are particularly obvious with respect to land-based surfaces in transportation systems, including roads and highways, bridges, parking lots, sidewalks, airport runways, train tracks. Ice on roads and bridges is frequently a cause of automobile accidents resulting in personal injury and death, as well as material damage. Large amounts of material resources, money and man-hours are spent annually to remove ice and snow from roads other transportation-related surfaces to clear them for use and to reduce risks of slipping and skidding on iced surfaces. The accidents and time delays associated with iced surfaces are major causes of inconvenience and personal and economic damage.

SUMMARY OF THE INVENTION

The invention helps to solve some of the problems mentioned above by providing systems and methods for modifying the adhesion strength of ice to surfaces of solids. Systems and methods in accordance with the invention are particularly applicable to problems associated with ice and surfaces in the field of transportation. Nevertheless, systems and methods in accordance with the invention are generally applicable to reduce problems caused by ice.

A basic embodiment for deicing a surface of a solid object includes a first electrode contiguous with the surface, and a second electrode. The first and second electrodes are separated by an interelectrode distance, and they cover the surface being protected against ice. The first electrode and the second electrode define an interelectrode space between the electrodes. A power source is connected to the first electrode and the second electrode. The power source is a DC power source or a low-frequency AC power source. When conductive water fills the interelectrode space between the electrodes, the water completes an electrical circuit including the two electrodes. A DC or low-frequency AC current is applied, causing electrolysis of the water molecules and formation of gas bubbles that reduce ice adhesion. Water in the electrode space providing electrical connection between the electrodes may be ice or liquid water. The interelectrode distance typically does not exceed 10 mm. Preferably, the interelectrode distance has a value in a range of about from 0.5 to 10 mm. The power source is typically capable of providing a voltage in a range of about from 2 to 100 volts. The current density in the water in the interelectrode space at the electrodes has a value in a range of about from 0.1 to 10 $mA/cm^2$.

In some embodiments in accordance with the invention, the surface of the object being protected is electrically nonconductive. A typical example is the nonconductive surface of a concrete or asphalt road. In certain of these embodiments, the first electrode is a continuous layer of conductive material contiguous with and covering a first portion of the surface, the second electrode is a continuous layer of conductive material contiguous with and covering a second portion of the surface, and the interelectrode space covers a third portion of the surface between the first and second portions. The conductive material may be selected from many compositions and structures of conductive materials, including metal sheets, conductive metal oxide, conductive concrete, conductive asphalt, conductive polymer, carbon, and conductive paint.

In other embodiments in which the surface is electrically nonconductive, the first electrode is a bottom electrode layer disposed on the surface, and the second electrode is a porous top electrode layer located above the first electrode. Such embodiments typically include a porous insulator disposed between the bottom first electrode and the porous top second electrode layer. Thus, certain embodiments include a laminate coating covering the surface of the object, whereby the laminate coating comprises a bottom electrode layer, a porous insulator layer, and a porous top electrode layer.

In other embodiments, a composite mesh coating covers the nonconductive surface. Typically, a composite mesh coating contains a plurality of first electrode wires, a plurality of second electrode wires, and a plurality of insulator fibers, wherein the insulator fibers are woven into the mesh to insulate electrically the first electrode wires from the second electrode wires.

In a second group of embodiments in accordance with the invention, the surface of the object being protected against icing is conductive and serves as the first electrode. In these embodiments, the second electrode is a porous conductive layer located above the first electrode surface. Such embodiments typically further include a porous insulator layer that electrically insulates the second electrode from the first electrode surface. For example, some embodiments include a mesh that covers the first electrode surface. Such a mesh typically comprises conductive second electrode wires having a top and bottom, and the bottom of the second electrode wires is coated with a coating of an electrical insulator. The mesh is structured and assembled in the system so that the second electrode wires are separated from the first electrode surface by an interelectrode distance in accordance with the invention. The mesh may be mounted proximate to the first electrode surface using one of various techniques. For example, the mesh may be pressed onto the first electrode surface such that the bottom of the second electrode wires is not in electrical contact with the first electrode surface. In another basic embodiment, a composite mesh coating covers the first electrode surface and the composite mesh coating comprises a plurality of electrically conductive second electrode wires and a plurality of electrically insulating insulator fibers. The mesh is constructed such that the insulator fibers separate the second electrode wires from the first electrode surface.

Numerous other structures and compositions in accordance with the invention may be utilized.

DESCRIPTION OF THE INVENTION

The invention is described herein with reference to FIGS. 1–8. It should be understood that the structures and systems depicted in schematic form in FIGS. 1–8 serve explanatory purposes and are not precise depictions of actual structures and systems in accordance with the invention. Furthermore, the embodiments described herein are exemplary and are not intended to limit the scope of the invention, which is defined in the claims below.

Systems and methods using electrolysis of water molecules to decrease ice adhesion are useful to prevent and remove ice on large-area surfaces, for example, on land-based surfaces of transportation systems, such as, roads and highways, bridges, parking lots, sidewalks, airport runways, train tracks.

Embodiments in accordance with the invention include a first electrode, a second electrode, an interelectrode space between the electrodes, and a power source connected to the first electrode and a second electrode. Usually, the power source is a DC power source. The power source provides a voltage differential across the electrodes. When the interelectrode space between the first and second electrodes is occupied by ice or water having electrical conductivity, the ice or water provides an electrical connection between the electrodes. As a result, the voltage across the electrodes generates an electric current between the electrodes through the interelectrode space. The DC voltage and the DC electric current cause electrolysis of the water molecules at the first and second electrodes. Electrolysis at the "negative" electrode, or cathode, produces atomic hydrogen radicals. The hydrogen atoms combine to form gaseous molecular hydrogen, $H_2$. The hydrogen gas molecules nucleate to form hydrogen gas bubbles. Similarly, electrolysis at the "positive" electrode, or anode, produces atomic oxygen radicals. The oxygen atoms combine to form gaseous molecular oxygen, $O_2$. The oxygen gas molecules nucleate to form oxygen gas bubbles. The hydrogen and oxygen gas bubbles reduce the adhesion of ice contiguous to the electrodes. A low-frequency AC power source may also be utilized in accordance with the invention. In this specification, the term "low-frequency AC" means AC having a frequency not greater than about 5–10 Hz. At frequencies greater than about 5–10 Hz, there is not sufficient time for molecular hydrogen and oxygen molecules to nucleate and form gas bubbles because $H_2$ and $O_2$ molecules are generated at a different electrode from one alternating cycle to another.

In alternative embodiments in accordance with the invention, the mixing hydrogen and oxygen gases are ignited. The small explosions and shock waves resulting from ignition of the hydrogen-oxygen gas mixture break the ice at the ice-solid interface and remove ice fragments from the surface being protected. The ignition is conducted using various techniques. For example, ignition is achieved by applying short high-voltage pulses between the first and second electrodes of the deicing system, thereby providing electric sparks. In another example, ignition is conducted by inserting one or several small spark plugs at the electrodes. With reference to sparks for igniting hydrogen and oxygen gases, the term "at the electrodes" is used broadly to mean between the electrodes or close enough to them to ignite the mixture of hydrogen and oxygen.

The rate of the electrolysis reactions, and thereby the rate of hydrogen and oxygen gas production, at the first and second electrodes is dependent on the electric current density between the electrodes, among other factors. For example, DC current or low-frequency AC current in the ice or liquid water in the interelectrode space between the first electrode and the second electrode typically has a current density in a range of from 0.1 to 10 $mA/cm^2$. The electric current density is dependent on the conductivity of the ice or water in the interelectrode space, as well as on the interelectrode distance, among another factors. The "interelectrode distance" is the distance between adjacent, oppositely-polarized electrodes. The interelectrode distance in a system for deicing of land-based surfaces may be relatively large because ice, liquid water and snow on roads and other land-based surfaces usually contain contaminants, resulting in high electrical conductivity. Because of the high conductivity of the contaminated ice, snow and water in the interelectrode space, the interelectrode distance between electrodes typically has a value in a range of from 0.5 to 10 mm.

To prevent electrical shorting of the first and second electrodes, an electrical insulator is disposed between the first and second electrodes. The electrical insulator may take many forms. It is only necessary that the electrical insulator allow water or ice to connect electrically the first and second electrodes and, thereby, to conduct electrical current between the electrodes.

Figure 1:
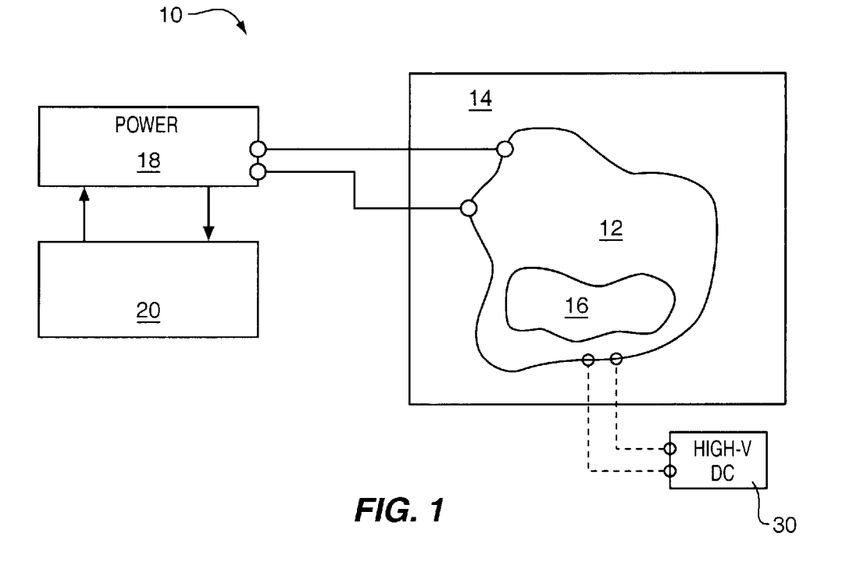
FIG. 1 shows in schematic form a system in accordance with the invention, containing an electrical deicing coating disposed on a surface to reduce the adhesion of ice.

FIG. 1 shows in schematic form a system 10 in accordance with the invention, containing an electrical deicing coating 12 disposed on surface 14 to reduce the adhesion of ice 16. Surface 14 may be the surface of, for example, a road or highway, a bridge, a parking lot, sidewalks, an airport runway, or train tracks. Generally, surface 14 may be any large-area surface subjected to cold, wet and ice conditions; for example, a road sign or a ship superstructure. Coating 12 is preferably flexible so as to physically conform to the shape of surface 14. In one basic embodiment, coating 12 includes a first electrode and a second electrode separated by an interelectrode distance. When ice or water is present, its fills the interelectrode space between the first and second electrodes, thereby electrically connecting the first and second electrodes. In operation, a DC or a low-frequency AC voltage is applied to coating 12 by power source 18. Typically, this voltage is in a range of from about 2 to 100 volts, with higher voltages being applied for lower temperatures.

When voltage is applied, some of the $H_2O$ molecules of ice or liquid water present in the interelectrode space decompose into gaseous oxygen and hydrogen through electrolysis. Further, gases form within ice 16, generating high-pressure bubbles that exfoliate ice 16 from coating 12 and from surface 14. Typically, the current through the ice or water in the interelectrode space generated by the voltage applied across the electrodes has a current density in a range of from about 0.1 to 10 $mA/cm^2$. By way of example, for a temperature of −10° C. and an anode-to-cathode distance (i.e., "interelectrode distance") of 1 mm in coating 12, approximately 20 volts is applied to coating 12 to provide 10 $mA/cm^2$ current density through impure ice, such as found on roads. If desired, a voltage regulator subsystem 20 is connected in feedback with power source 18, and hence with the circuit formed by coating 12 and ice 16. The applied voltage is thereby increased or decreased to optimize operation according to prevailing conditions.

In alternative embodiments in accordance with the invention, the mixing hydrogen and oxygen gases are ignited. FIG. 1 depicts an optional high-voltage DC power supply 30 connected to coating 12 to provide a voltage for generating ignition sparks. The dashed lines connecting power supply 30 to coating 12 indicate that high-voltage power supply 30 and the ignition of the hydrogen and oxygen gas mixture are optional features of the invention. In one exemplary embodiment, high-voltage power supply 30 provides short high-voltage pulses between the first electrode and second electrode, causing electric sparks. High-voltage pulses of 1000 volts or more having a duration of about one millisecond or less are usually sufficient to generate sparks. The small explosions and shock waves resulting from ignition of the hydrogen-oxygen gas mixture breaks the ice at the ice-solid interface and removes ice fragments from the surface being protected.

Figure 2:
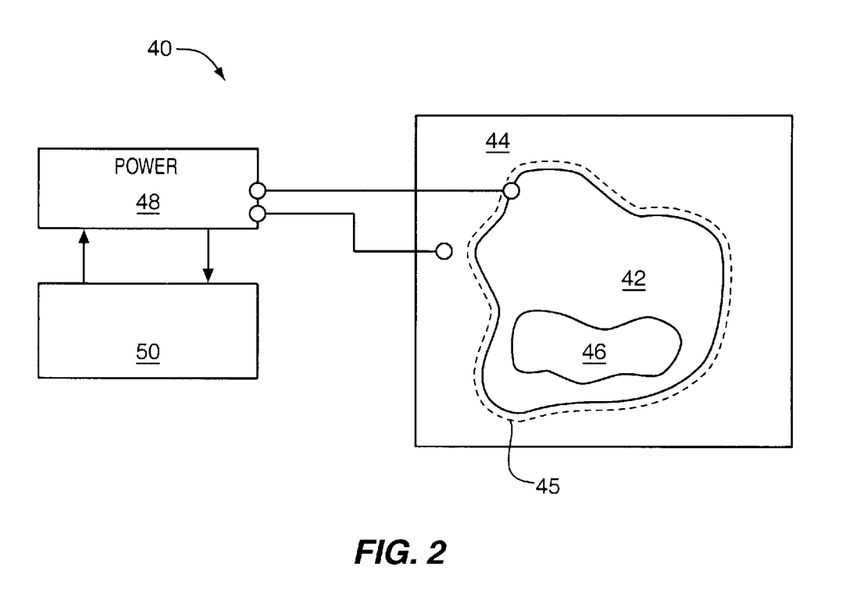
FIG. 2 shows a system containing an electrical deicing coating disposed over a conductive surface.

In one of several basic embodiments, the land-based surface is conductive and serves as the first electrode. FIG. 2 shows a system 40 containing an electrical deicing coating 42 disposed over conductive surface 44. Conductive surface 44 may be, for example, a road covered by conductive paint, a road surface containing electrically conductive material, or a metal bridge. Generally, surface 44 may be any electrically-conductive large-area surface subjected to cold, wet and ice conditions; for example, a road sign or a ship superstructure. Coating 42 is preferably flexible so as to physically conform to the shape of surface 44. Coating 42 is porous to water so that it allows water or ice to occupy at least a portion of the interelectrode space and, thereby, electrically connect the first and second electrodes. Conductive surface 44 serves as the first electrode, and coating 42 includes the second electrode. In operation, a voltage is applied between coating 42 and surface 44 by power source 48. The potential bias applied to coating 42 is typically equal and opposite to the bias applied to surface 44. If desired, a porous insulator 45 may be disposed in the interelectrode space between coating 42 and surface 44. As described below, coating 42 preferably includes both the second electrode and insulator 45. Insulator 45 is also porous so that it allows water or ice to occupy at least a portion of the interelectrode space. In operation, a DC or a low-frequency AC voltage is applied to deicing coating 42 and conductive surface 44 by a power source 48. Typically, this voltage is in a range of from about 2 to 100 volts, with higher voltages being applied for lower temperatures.

When voltage is applied, some of the $H_2O$ molecules of ice or liquid water present in the interelectrode space decompose into gaseous oxygen and hydrogen through electrolysis. Further, gases form within ice 46, generating high-pressure bubbles that exfoliate ice 46 from coating 42 and from surface 44. Typically, the current through the ice or water in the interelectrode space generated by the voltage applied across the electrodes has a current density in a range of from about 0.1 to 10 $mA/cm^2$. If desired, a voltage regulator subsystem 50 is connected in feedback with power source 48 to optimize operation.

Figure 3:
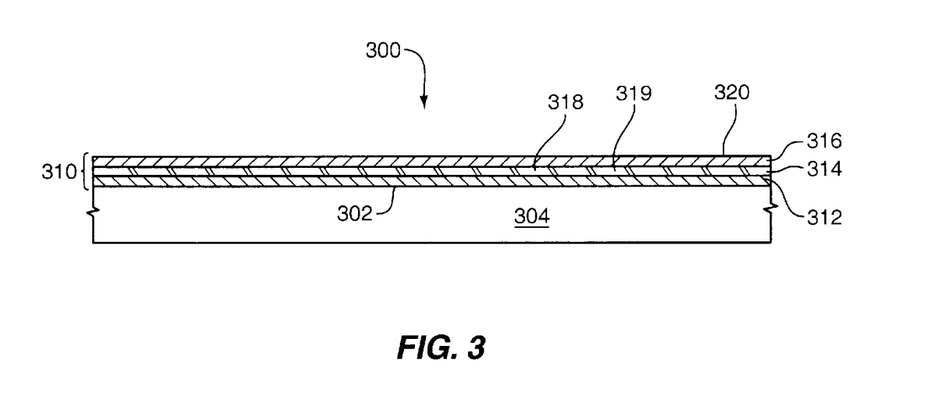
FIG. 3 depicts in schematic form a cross-section of a system containing a laminate coating having a bottom, first electrode, a porous insulator layer, and a top, second electrode layer.

FIG. 3 depicts in schematic form a cross-section of a portion 300 of a system in accordance with the invention. Portion 300 includes a surface 302 of a solid object 304. Typically, surface 302 is a land-based surface of a road, bridge, sidewalk, airport runway or other land-based transportation surface. As explained above, however, object 304 may be any object having a large surface area exposed to ice, such as a ship superstructure. Portion 300 further includes a stacked coating 310. Coating 310 includes a bottom, first electrode 312, a porous insulator 314, and a top, porous second electrode 316. First electrode 312 and second electrode 316 define an interelectrode space 318 between them. Porous insulator 314 is located in interelectrode space 318. Interelectrode space 318 contains void space 319 that is filled by ice or liquid water, electrically connecting first electrode 312 and second electrode 316. Porous insulator 314 may comprise relatively nonporous material having holes, thereby forming the necessary void space. Alternatively, porous insulator 314 may consist of porous material having an internal void space that is filled and occupied by liquid water or ice. Top, second electrode 316 is also necessarily pervious to water so that water or ice deposited on the outer surface 320 of second electrode 316 can fill interelectrode space 318, thereby providing electrical contact between first electrode 312 and second electrode 316. First electrode 312 and second electrode 316 may be fabricated from a variety of conductive materials. For example, the two electrodes may be made of metal sheets, conductive metal oxide, conductive asphalt, conductive polymer, carbon, conductive paint or any other nonexpensive durable and conductive material. Stacked coating 310 may be a laminate coating containing three layers, namely, a bottom electrode layer 312, a porous insulator layer 314, and a porous top electrode layer 316. The laminate may be applied as a separate element onto a surface of an object being protected against the ice. Or, stacked coating 310 may be incorporated into the structure of the object itself during fabrication of the object.

The term "deicing" as used in the specification has a broad meaning, which includes decreasing the adhesion strength of ice to the surface being protected. It also means inhibiting or preventing the formation of large ice deposits on the surface of a solid object.

Terms of orientation, such as "top", "bottom", "above" and others, are used with relation to the surface being protected by deicing. For example, with reference to FIG. 3, bottom electrode layer 312 is closer to surface 302 than top electrode layer 316. Therefore, top electrode layer 316 is "above" bottom electrode layer 312. In FIG. 3, surface 302 is substantially horizontal. It is understood that a surface being protected in accordance with the invention may be spatially oriented in many positions different from horizontal.

The term "contiguous with the surface" and related terms is used broadly in one sense to mean that an electrode or electrode layer is embedded in or part of or adjacent to the surface being protected by deicing in accordance with the invention. With regard to ice, the term "contiguous" indicates that ice is on or close to or adjacent to the surface being protected.

The term "cover the surface" and similar terms are used in the normal sense to indicate that an electrode or an insulator covers all or a part of the surface being protected in accordance with the invention. In certain instances, the term may also refer to an electrode that is part of or embedded in a surface. The term alone does not indicate actual direct physical contact, although a structural element of an embodiment covering another element may be in actual physical contact with it. For example, in some embodiment, a second electrode covers a first electrode, but the first and second electrodes do not directly contact each other.

The term "insulator fiber" is used in a broad sense to refer to any dielectric or electrically insulating material that has an elongated shape.

Figure 4:
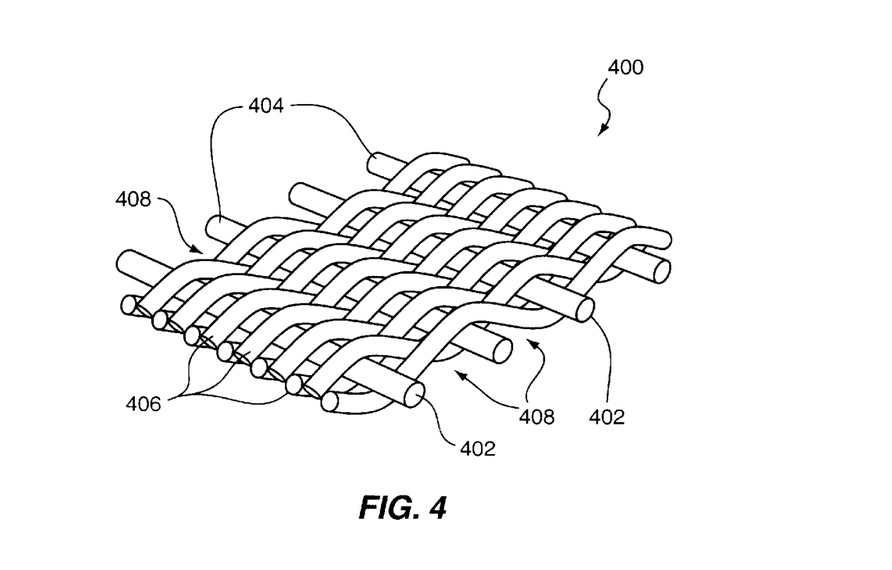
FIG. 4 shows a sketch of a composite mesh coating suitable for use in a system in accordance with the invention, in which the mesh includes first electrode wires, second electrode wires, and insulator fibers.

FIG. 4 shows a sketch of a mesh coating 400 suitable for use in a system in accordance with the invention; for example, in a variation of a system as described with reference to FIG. 3. Mesh 400 includes first electrode wires 402 and second electrode wires 404, in accordance with the invention. If DC current is used, then one set of electrode wires (e.g., electrode wires 402) functions as anodes, and the other set of electrode wires functions as cathodes. In any case, electrode wires 402 and electrode wires 404 are oppositely polarized during operation. Dielectric insulator fibers 406 form an insulating weave about wires 402, 404 to prevent shorting. Wires 402, 404 are connected to a power source (for example, power source 18 or 48) such that appropriate current density causes electrolysis of $H_2O$ molecules at the electrode surfaces. Typical interelectrode distances between adjacent wires 402, 404 are about 0.5 to 10 mm, although smaller or larger distances are also suitable. Wires 402, 404 comprise any electrically conductive material, such as conductive metal or conductive polymer. For example, wires 402, 404 typically comprise titanium or niobium or other metal with high resistance to electrocorrosion. Generally, anode wires have a very high resistance to anodic corrosion. For that, they may be coated with thin layers of platinum or gold or amorphous carbon. Other alloys may also be applied. Cathode wires are preferably impervious to hydrogen. Examples of good cathode material include gold, copper, brass, bronze, and silver. In contrast to a system as depicted in FIG. 3, first electrode 402 and second electrode 404 are not disposed one on top of the other, rather they are essentially side-by-side. The interelectrode distance and the interelectrode space 408 between the electrodes are determined partially by the thickness of wires 402, 404 and fibers 406. Mesh coating 400 is preferably flexible so that it physically conforms to the shape of a surface, such as surface 302. Mesh coating 400 may be applied and held firm on the surface using a variety of techniques. For example, a mesh 400 may be embedded near the top surface of a concrete or asphalt road. Or, a mesh 400 may be pressed into the top surface of soft asphalt.

Figure 5:
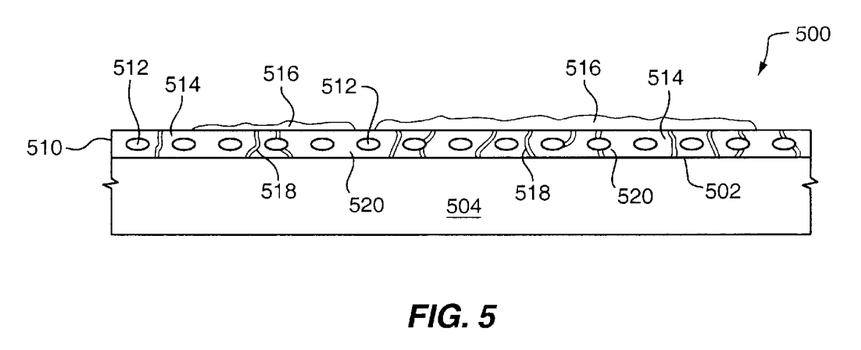
FIG. 5 depicts in schematic form a cross-section of a system containing a conductive surface of a solid object and a porous composite coating that includes electrically conductive material and insulator material.
Figure 6:
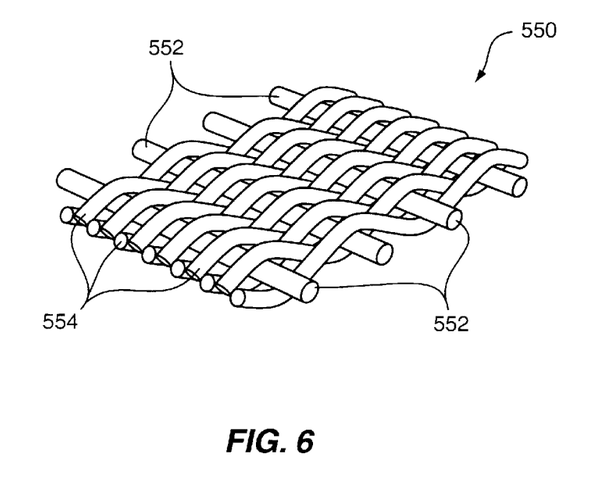
FIG. 6 depicts in sketch form a composite mesh coating containing electrode wires having the same polarity and insulator fibers that separate the electrode wires from a conductive surface.

FIG. 5 depicts in schematic form a cross-section of a portion 500 of a system in accordance with the invention. Portion 500 includes a conductive surface 502 of a solid object 504. Solid object 504 is an asphalt road or a concrete runway or other object fabricated to make it or its surface 502 electrically conductive. For example, asphalt doped with carbon black to make it electrically conductive is commercially available and economically viable. Solid object 504 functions, therefore, as the first electrode. Portion 500 further includes a composite coating 510 that includes electrically conductive material 512 and insulator material 514. The electrically conductive material 512 in composite coating 510 functions as the second electrode, which is separated by the insulator material 514 from the first electrode to prevent shorting. Composite coating 510 is porous so that ice or liquid water 516 is able to fill void space 518 of the interelectrode space 520 between electrodes 504 and 512. FIG. 6 depicts in sketch form a composite mesh coating 550 in accordance with the invention. Coating 550 contains electrode wires 552, connected to a power source so that they have the same polarity. The electrode wires 552 may comprise any conductive material. Typically, electrode wires 552 comprise conductive metal. Coating 550 also contains insulator fibers 554. Coating 550 may be applied, for example, to surface 502 of FIG. 5, where surface 502 is conductive and functions as the first electrode surface. When DC or low-frequency AC power is applied to surface 502 and electrode wires 552, a potential bias exists between surface 502 and wires 552. Insulator fibers 554 prevent wires 552 from shorting, and further prevent shorting between wires 552 and surface 502. Ice or liquid water in the interelectrode space between electrode wires 552 and electrode surface 502 completes the circuit between electrode wires 552 and electrode surface 502. When power having sufficient voltage is applied to the electrodes, electrolysis occurs at the electrodes, resulting in a reduction of ice adhesion strength in accordance with the invention. Composite mesh coatings 510 and 550 may be applied to conductive surfaces 502 using a variety of techniques. For example, a mesh 510, 550 may be embedded near the top surface of a concrete or asphalt road. Or, a mesh 510, 550 may be pressed into the top surface of soft asphalt.

Figure 7:
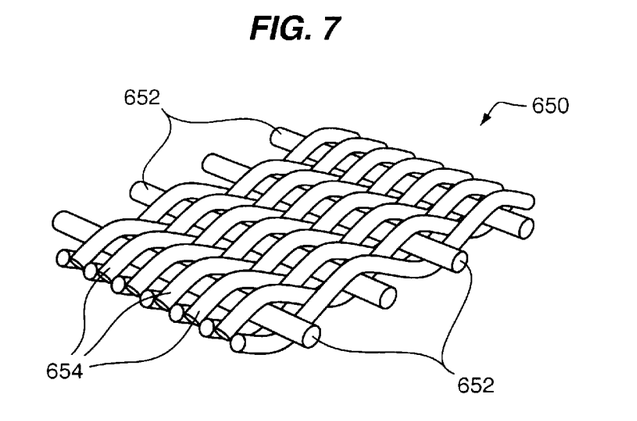
FIG. 7 shows a conductive metal mesh coating in accordance with the invention, in which the coating is applied to cover a conductive surface, and the bottom of the mesh is coated with a coating of an electrical insulator.

FIG. 7 shows a conductive mesh coating 650 in accordance with the invention. Mesh coating 650 comprises conductive wires 652 and conductive wires 654, which have the same polarity during operation. Conductive mesh coating 650 is applied to cover a conductive surface 502. Conductive surface 502 functions as the first electrode, and conductive mesh 650 functions as the second electrode. An insulator occupies at least a portion of the interelectrode space between conductive mesh 650 and conductive surface 502. In a typical embodiment, mesh 650 is a flat, flexible mesh comprising conductive wires, having a top and bottom. The bottom of the flat mesh is coated with a coating of an electrical insulator. This flat mesh is pressed onto the land-based surface such that the conductive bottom of the flat mesh is not in electrical contact with the land-based surface. Rather, the electrical insulator coating on the bottom of the mesh electrically insulates the flat wire mesh of the second electrode from the underlying first electrode surface. When water or ice fills the interwire openings in the mesh and the interelectrode space, then the ice or water in the mesh openings and interelectrode space electrically connects the first and second electrodes.

Figure 8:
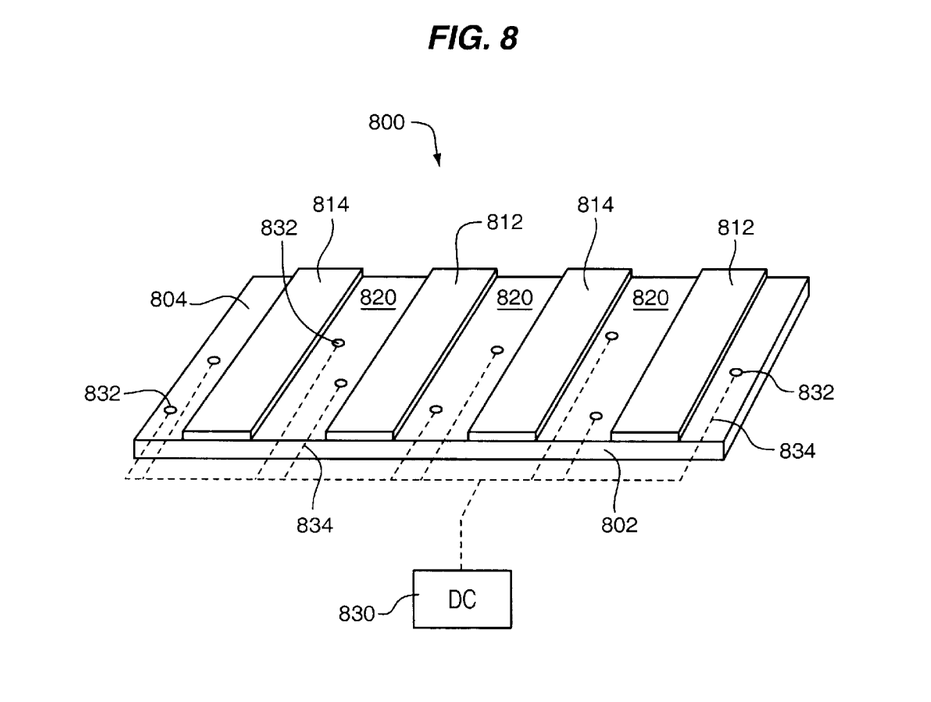
FIG. 8 depicts in schematic form a perspective view of a section of a system in accordance with the invention, in which a continuous first electrode layer of conductive material covers a first portion of the land-base surface, a continuous second electrode layer of conductive material covers a second portion of the land-base surface, and a nonconductive third portion of the surface separates the first and second electrode portions.

In still another embodiment, the first electrode is a continuous layer of conductive material covering a first portion of the land-based surface, the second electrode is a continuous layer of conductive material covering a second portion of the land-base surface, and the interelectrode space covers a third portion of the land-based surface between the first and second electrode portions. The conductive material may be selected from many types, shapes and compositions, including metal sheets, conductive asphalt or concrete, conductive polymers, and conductive paints. FIG. 8 depicts in schematic form a perspective view of a section 800 of a system in accordance with the invention. Section 800 includes an object 802 having a surface 804 to be protected against ice by a deicing method in accordance with the invention. Section 800 includes interdigitated electrodes 812, 814, each connected to terminals of a power source (not shown) that provides electrolysis voltage. The term "interdigitated" means that "fingers" of oppositely charged electrode material are arranged alternatingly. At any moment during operation, electrodes 812 have a polarity opposite to that of electrodes 814. Thus, during operation, each of electrodes 812, 814 is adjacent to an oppositely polarized electrode. If DC voltage is applied, then first electrodes 812 may be the anodes, while second electrodes 814 are the cathodes, or vice versa. The interelectrode distance between adjacent electrodes is typically in a range of from 0.5 to 10 mm, although smaller or larger distances are also suitable, depending on available applied voltage, expected temperature, thickness of the ice (not shown), and ice purity. Adjacent electrodes 812, 814 define interelectrode spaces 820. Ice or liquid water that fills interelectrode space 820 functions to connect electrically the adjacent electrodes 812, 814. When electrolysis voltage is applied, some of the $H_2O$ molecules of ice or water present in interelectrode space 820 decompose into gaseous oxygen and hydrogen through electrolysis. Further, gases form within ice, generating high-pressure bubbles that exfoliate the ice from surface 804. The electrodes 812, 814 may be fabricated using various techniques. For example, electrodes 812, 814 may be strips or sheets of metal that are embedded in concrete or asphalt. The electrodes 812, 814 may be conductive portions of a composite object containing conductive and not conductive portions. For example, electrodes 812, 814 may be strips or sections of conductive asphalt, while the interelectrode space 820 between the electrodes comprises nonconductive asphalt. Electrodes 812, 814 may be strips of conductive paint applied to a nonconductive surface. A typical nonconductive surface includes nonconductive asphalt or concrete or a nonconductive paint applied to a conductive object, such as a metal bridge.

In alternative embodiments in accordance with the invention, the mixing hydrogen and oxygen gases are ignited. FIG. 8 depicts an optional DC power supply 830 connected to optional spark plugs 832 located between first electrodes 812 and second electrodes 814. Each of spark plugs 832 comprise essentially two point electrodes separated by a small sparking distance. In an exemplary embodiment, spark plugs 832 are distributed over the surface area of surface 804 at a density of about $0.2/cm^2$. The point electrodes of spark plugs 832 are separated by a sparking distance of about 0.1 mm, and power supply 830 provides a DC voltage of about 50 to 100 volts. Each dashed line 834 in FIG. 8 represents a pair of oppositely polarized leads from power supply 830 to a spark plug 832. Lines 834 connecting power supply 830 and spark plugs 834 are dashed to indicate that these features are optional.

As discussed above, the DC or low-frequency AC power source 18, 48 in embodiments in accordance with the invention typically provides a potential difference in a range of from 2 to 100 volts between electrodes. In operation, the DC or low-frequency AC current has a current density in a range of from 0.1 to 10 $mA/cm^2$ at the electrodes.

Systems and methods in accordance with the invention are useful in a wide variety of circumstances and applications to reduce the adhesion strength of ice to solid surfaces and to prevent the formation of large deposits of ice and snow on a solid surface. Examples of surfaces that may be protected in accordance with the invention were named in the description above. It is clear that the invention is useful in many other applications and fields. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above systems and methods without departing from the scope of the invention, it is intended that all subject matter contained in the above description or shown in the accompanying drawing be interpreted as illustrative and not in a limiting sense. Consequently, the invention is to be construed as embracing each and every novel feature and novel combination of features present in or inherently possessed by the systems, methods and compositions described in the claims below and by their equivalents.

I claim:

1. A system for deicing a surface of a solid object, comprising:
    a first electrode contiguous with the surface;
    a second electrode, separated from the first electrode by an interelectrode distance, wherein the first and second electrodes cover the surface;
    an interelectrode space between the first electrode and the second electrode; and
    a power source connected to the first electrode and the second electrode, wherein the power source is selected from the group consisting of a DC power source and a low-frequency AC power source.

2. A system as in claim 1, wherein the surface is a land-based transportation surface.

3. A system as in claim 1, wherein the interelectrode distance has a value in a range of from 0.5 to 10 mm.

4. A system as in claim 1, wherein the power source is capable of providing a voltage in a range of from 2 to 100 volts.

5. A system as claimed in 1, wherein the power source is capable of providing a current density in water at the electrodes in a range of from 0.1 to 10 $mA/cm^2$.

6. A system as in claim 1, wherein the surface is electrically nonconductive, the first electrode is a continuous layer of conductive material covering a first portion of the surface, the second electrode is a continuous layer of conductive material covering a second portion of the surface, and the interelectrode space covers a third portion of the surface between the first and second portions.

7. A system as in claim 6, wherein the conductive material is selected from the group consisting of metal sheets, conductive metal oxide, conductive concrete, conductive asphalt, conductive polymer, carbon, and conductive paint.

8. A system as in claim 1, wherein the surface is electrically nonconductive, the first electrode is a bottom electrode layer disposed on the surface, the second electrode is a porous top electrode layer located above the first electrode, and further comprising a porous insulator disposed between the bottom first electrode and the porous top second electrode layer.

9. A system as in claim 8, wherein a stacked, laminate coating covers the surface and the laminate coating comprises a bottom electrode layer, a porous insulator layer, and a porous top electrode layer.

10. A system as in claim 1, wherein a composite mesh coating covers the surface and the composite mesh coating comprises a plurality of first electrode wires, a plurality of second electrode wires, and a plurality of insulator fibers, wherein the insulator fibers electrically insulate the first electrode wires from the second electrode wires.

11. A system as in claim 1, wherein the surface is conductive and serves as the first electrode.

12. A system as in claim 11, wherein the second electrode is a porous conductive layer located above the first electrode surface, and further comprising a porous insulator layer that electrically insulates the second electrode from the first electrode surface.

13. A system as in claim 11, wherein a mesh covers the first electrode surface, and the mesh comprises conductive second electrode wires having a top and bottom, the bottom of the second electrode wires being coated with a coating of an electrical insulator.

14. A system as in claim 13, wherein the mesh is assembled on the first electrode surface such that the bottom of the second electrode wires is not in electrical contact with the first electrode surface.

15. A system as in claim 11, wherein a composite mesh coating covers the first electrode surface and the composite coating comprises a plurality of electrically conductive second electrode wires and a plurality of electrically insulating insulator fibers, the insulator fibers separating the second electrode wires from the first electrode surface.

16. A system as in claim 1, further comprising a DC power supply for providing a voltage to generate sparks at the electrodes.

17. A system as in claim 16, further comprising a spark plug connected to the DC power supply for generating sparks at the electrodes.

18. A method for deicing a surface of a solid object, comprising steps of:

providing a first electrode contiguous with the surface;

providing a second electrode, separated from the first electrode by an interelectrode distance, wherein the first and second electrodes cover the surface and define an interelectrode space between the first electrode and the second electrode; and applying a voltage differential between the first electrode and the second electrode to generate an electric current in water in the interelectrode space, wherein voltage is selected from the group consisting of a DC voltage and low-frequency AC voltage.

19. A method as in claim 18, wherein the interelectrode distance has a value in a range of from 0.5 to 10 mm.

20. A method as in claim 18, wherein the voltage has a value in a range of from 2 to 100 volts.

21. A method as in claim 18, wherein the voltage causes a current density in water at the electrodes in a range of from 0.1 to 10 mA/cm$^2$.

22. A method as in claim 18, further comprising a step of generating a spark to ignite a mixture of hydrogen and oxygen gases.

* * * * *